US008484459B2

(12) United States Patent
Kalliola et al.

(10) Patent No.: US 8,484,459 B2
(45) Date of Patent: Jul. 9, 2013

(54) SECURE TRANSFER OF INFORMATION (75) Inventors: Janne Kalliola, Espoo (FI); Erno Kaikkonen, Helsinki (FI); Kalle Virta, Espoo (FI); Janne Salo, Helsinki (FI); Sundeep Pundamale, Helsinki (FI)

(73) Assignee: Exove Oy, Helsinki (FI)

( * ) Notice: Subject to any disclaimer, the term of this patent is extended or adjusted under 35 U.S.C. 154(b) by 456 days.

(21) Appl. No.: 12/672,422

(22) PCT Filed: Aug. 15, 2008

(86) PCT No.: PCT/FI2008/050463
§ 371 (c)(1),
(2), (4) Date: Feb. 5, 2010

(87) PCT Pub. No.: WO2009/024647
PCT Pub. Date: Feb. 26, 2009

(65) Prior Publication Data
US 2011/0099366 A1 Apr. 28, 2011

(30) Foreign Application Priority Data
Aug. 17, 2007 (FI) .................................. 20075577

(51) Int. Cl.
H04L 29/06 (2006.01)
(52) U.S. Cl.
USPC .......................................... 713/155; 713/153
(58) Field of Classification Search
USPC ................................................. 713/153, 155
See application file for complete search history.

(56) References Cited

U.S. PATENT DOCUMENTS

| 6,684,248 | B1 | | 1/2004 | Janacek et al. |
| 7,054,447 | B1 | * | 5/2006 | Price, III ........................ 380/278 |
| 7,596,697 | B2 | * | 9/2009 | Sandhu et al. ................. 713/171 |
| 8,117,438 | B1 | * | 2/2012 | Albisu et al. .................. 713/156 |
| 8,146,143 | B1 | * | 3/2012 | Emigh et al. ...................... 726/6 |
| 2002/0076053 | A1 | | 6/2002 | Hachimura |
| 2002/0178366 | A1 | | 11/2002 | Ofir |
| 2003/0046533 | A1 | | 3/2003 | Olkin et al. |
| 2003/0140223 | A1 | * | 7/2003 | Desideri ......................... 713/153 |
| 2003/0154371 | A1 | * | 8/2003 | Filipi-Martin et al. ........ 713/153 |
| 2004/0133520 | A1 | * | 7/2004 | Callas et al. .................... 705/51 |
| 2005/0198170 | A1 | * | 9/2005 | LeMay et al. .................. 709/206 |

(Continued)

FOREIGN PATENT DOCUMENTS

| EP | 0907120 A2 | 4/1999 |
| EP | 1249981 A1 | 10/2002 |

OTHER PUBLICATIONS

International Search Report issued in PCT/FI2008/050463.

(Continued)

*Primary Examiner* — Chau Le
(74) *Attorney, Agent, or Firm* — Shalom Wertsberger; Saltamar Innovations (57) ABSTRACT Disclosed is a method for secure transfer of information through a centralized system. The method comprising: maintaining user account information, a user account of a certain user comprising at least a user id and associated public and private keys, the private key being retrievable by means of a password of said certain user; receiving (411) identification information relating to a recipient; retrieving public key of said recipient from said user account information by means of said identification information; receiving (412) information content addressed to said recipient; storing (415) said information content for said recipient in encrypted form, said retrieved public key having been used in connection with encrypting said information content; and notifying (416) said recipient of the stored information content.

16 Claims, 7 Drawing Sheets

U.S. PATENT DOCUMENTS

2005/0257057 A1    11/2005  Ivanov et al.
2008/0065878 A1*   3/2008   Hutson et al. ................. 713/153
2008/0165972 A1*   7/2008   Worthington ................. 380/278
2009/0271627 A1*   10/2009  Cohen et al. ................. 713/171

OTHER PUBLICATIONS

Entrust "Encrypting email with your eyes closed", Nov. 2006, pp. 14-21, Copyright 2006 Entrust.

* cited by examiner

SECURE TRANSFER OF INFORMATION

FIELD OF THE INVENTION

The present invention generally relates to security in data communications and particularly, though not exclusively, to secure transfer of information.

BACKGROUND OF THE INVENTION

Internet and e-mail are widely used for exchanging various documents between different people. As internet is an open system, there is a need to secure the transferred documents and/or messages, when sensitive information is involved.

Many arrangements that provide secure transfer of information require specific security software at both communicating ends. There are however also solutions that may be used by means of a normal web browser, which is typically available in any computer device. For example FI 116815 B discloses one such solution.

In the message transfer system of FI 116815 a message that is to be transferred is encrypted with a password and stored in a secure server. The recipient of the message may then fetch the message by means of the password. The password is a one-time password, that is, a new password needs to be set every time a message is transferred. Furthermore, the system requires that the one-time password is transferred to the recipient through some other means than the message transfer system. Thus, two different communication channels need to be used every time a message is transferred. This may not be very convenient for the users.

SUMMARY OF THE INVENTION

Now a new approach for secure transfer of information, such as documents and/or messages, is presented.

According to a first aspect of the invention there is provided a method for secure transfer of information through a centralized system, the method comprising:
maintaining user account information, a user account of a certain user comprising at least a user id and associated public and private keys, the private key being retrievable by means of a password of said certain user,
receiving identification information relating to a recipient,
retrieving public key of said recipient from said user account information by means of said identification information,
receiving information content addressed to said recipient,
storing said information content for said recipient in encrypted form, said retrieved public key having been used in connection with encrypting said information content, and
notifying said recipient of the stored information content.

In an embodiment the information content is symmetrically encrypted with a random key, and the random key is asymmetrically encrypted with said retrieved public key, and the method further comprises storing in the centralized system the random key in encrypted form.

In an embodiment the information content is asymmetrically encrypted with said retrieved public key.

In an embodiment the method further comprises
receiving said information content in unencrypted form, and
encrypting said information content in the centralized system.

In an alternative embodiment the method further comprises
providing said retrieved public key to an external device, and
receiving said information content in encrypted form from said external device.

In this embodiment the information content is encrypted in some other device. For example client software residing in an end user device of the sender of the information content may conduct the encryption.

The phrase "private key being retrievable by means of a password" means that the password is needed for obtaining the private key. That is, the private key is secured with the password so that it is not possible to find out the private key without the password. In an embodiment the private key in the user account information is encrypted with said password. In another embodiment only part of the private key is stored in the user account information, combination of the stored part of the private key and the password forming a full private key.

The identification information may be for example an id stored in said user information, an email address of the recipient, phone number of the recipient, or some other address of the recipient.

In an embodiment the method further comprises
creating a user account for said recipient, responsive to being unable to find said user account information by means of said identification information, and
informing the recipient of the created user account.

In yet another embodiment the method further comprises
allowing a user to log in by means of login information comprising a user id and a password,
verifying validity of the login information,
receiving a pointer to encrypted information content and retrieving said encrypted information content,
decrypting private key associated with the user by means of the password,
retrieving said encrypted information content by means of the decrypted private key, and
providing to the user the information content in decrypted form.

Further the method may comprise
confirming that the login information is valid, if the password can be used for retrieving the private key relating to the user id.

Any time information content is transferred between devices in unencrypted/decrypted form, the transfer is preferably over a secure channel.

According to a second aspect of the invention there is provided an apparatus, comprising:
a storage area configured to store user account information, a user account of a certain user comprising at least a user id and associated public and private keys,
the private key being retrievable by means of a password of said certain user,
an input configured to receive identification information relating to a recipient and information content addressed to said recipient,
a processing unit configured to retrieve public key of said recipient from said user account information by means of said identification information, and
a storage area configured to store said information content for said recipient in encrypted form, said retrieved public key having been used in connection with encrypting said information content, wherein
the processing unit is further configured to notify said recipient of the stored information content.

According to a third aspect of the invention there is provided a memory medium comprising computer executable program code adapted to enable an apparatus to perform the method of the first aspect or any related embodiment.

According to a further aspect of the invention the method of the first aspect and any related embodiment may be generalized as a method of for secure transfer of information between registered users, the method comprising allowing users to upload information content addressed to a specific recipient, storing the information content for said specific recipient in encrypted form, said retrieved public key having been used in connection with encrypting said information content, and allowing said recipient to download the information content in decrypted form.

Herein a registered user is a user that has an account in the system. The public key may have been used in the encryption process either directly (for encrypting the information) or indirectly (e.g. for encrypting a separate encryption key used for encrypting the information). Other aspects of the invention may be generalized in a corresponding way.

Various embodiments of the present invention have been illustrated only with reference to certain aspects of the invention. It should be appreciated that corresponding embodiments may apply to other aspects as well.

BRIEF DESCRIPTION OF THE DRAWINGS

The invention will be described, by way of example only, with reference to the accompanying drawings, in which.

DETAILED SPECIFICATION

In the following examples transfer of messages is discussed. It should be noted that in this context a message may comprise a text body and/or one or more attached files. Additionally a message may refer to some other suitable type of information content that is to be transferred in electronic form. Depending on the implementation there may be some restrictions to the size of one message, but this is not mandatory.

Figure 1:
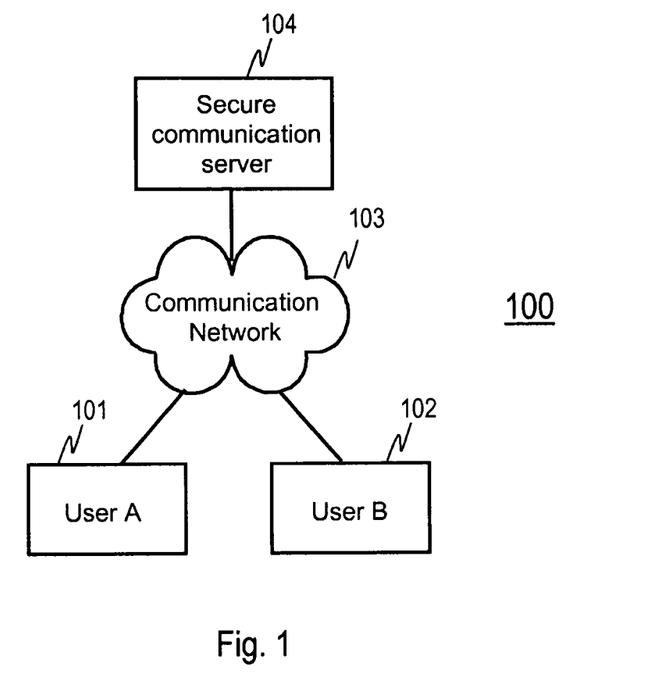
FIG. 1 shows a system of an embodiment of the invention.

FIG. 1 shows a system of an embodiment of the invention. The system comprises two end user devices, user A 101 and user B 102, and a secure communication server 104. The two end user devices 101 and 102 and the secure communication server are connected to a communication network 103. The communication network may be for example internet, a subnetwork that is part of the internet, or a network including various types of networks (e.g. internet and some mobile communication network). The secure communication server may be a general purpose computer or server that is configured to operate according to some embodiments of the invention. The users of the end user devices 101 and 102 may accomplish secure transfer of information between each other by means of the secure communication server 103. In an embodiment the secure information transfer service may be used by means of a general purpose web browser. In another embodiment some functionality is implemented in client software residing in the end user devices 101 and 102.

The users have an account in the service provided by the secure communication server. The information that is transferred is stored in the server in encrypted form. The encryption mechanism is at least partially recipient specific and not entirely message specific like in the prior art system of FI 116815. The system notifies users of any new messages addressed to them. Thereafter the users log into the system with their personal login information (e.g. a user id and a password) and fetch the messages. In this way there is no need to use a separate communication channel for communicating passwords like in the prior art system of FI 116815.

The encryption mechanism that is used is based on PKI (public key infrastructure). It is commonly understood that encryption effected by a PKI system is far more difficult to break than encryption with a simple password. Thus, as PKI keys are used for encrypting and decrypting the information that is transferred, one may achieve added security in comparison to simple password encryption. The PKI keys are however maintained in the system, whereby the users do not need any additional software or knowledge for using the system. Therefore, the system may provide added security and yet be an easy-to-use system that does not necessarily require any additional software.

Further details of the information transfer are discussed below in connection with various embodiments of the invention.

Figure 2A:
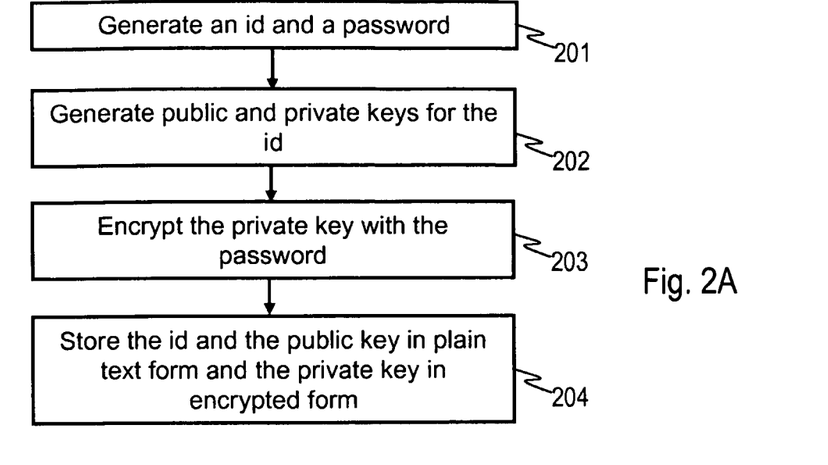
FIG. 2A is a flow diagram illustrating account creation in accordance with an embodiment.

FIG. 2A is a flow diagram illustrating account creation in accordance with an embodiment. The method proceeds as follows:

1. A user ID and a password are generated for a new user (phase 201). The new user (or some other entity creating a new account) may be allowed to choose the user ID and the password or some randomly selected values may be given.
2. Public and private keys are generated for the user ID (phase 202).
3. The private key is encrypted with the password (phase 203). Two-way encryption is used so that the private key can be retrieved, if the password is known.
4. The user ID and the public key are stored in plain text form and the private key is stored in encrypted form (phase 204).

In an embodiment also the password is encrypted and then stored in encrypted form. One-way encryption is however used in this case, so that it is not possible to retrieve the password. For example a hash calculated from the password may be stored. Validity of a password input by a user may then be verified by using the same hash function for calculating a hash of the password input by the user and then comparing the stored and calculated hashes.

In another embodiment some part of the password or the whole password may be stored in connection with the private key or the password may form part of the private key. For example combination of a stored part of the private key and a password of the respective user may form a full private key. In such case the part of the private key that is stored in the system does not necessarily need to be encrypted as a partial private key cannot be used for decrypting. It is however possible that the private key is encrypted also in this case.

As an example, the password and the associated private key may be given as an input to a function that outputs a partial private key. Then, when the private key needs to retrieved, the function is applied in the other direction and the partial private key and the password are input to the function and the function outputs the whole private key.

In case the password is not stored in the system at all, validity of a password input by a user may be verified by checking if the associated private key can be decrypted with the password input by the user.

A benefit that may be achieved with this kind of arrangement is that nobody (not even the users themselves) needs to have access to the private keys used in the system.

Figure 2B:
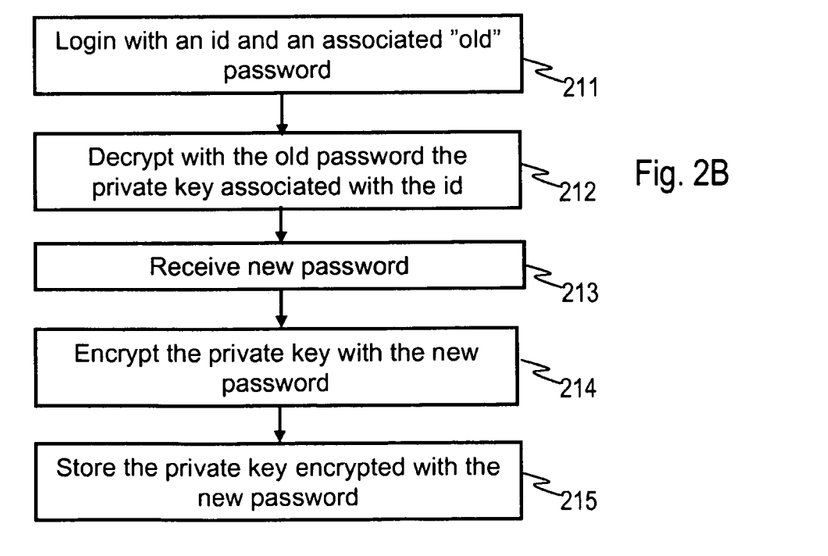
FIG. 2B is a flow diagram illustrating password change in accordance with an embodiment.

FIG. 2B is a flow diagram illustrating password change in accordance with an embodiment. The method proceeds as follows:

1. A user logs in with a user ID and an old password (phase 211).
2. The private key associated with the user ID is decrypted with the old password (phase 212).
3. The user inputs a new password (phase 213).
4. The private key associated with the user ID is encrypted with the new password (phase 214).
5. The private key is stored in encrypted form (phase 215).

That is, there is no need to change the private key of the user. In this way, documents that were encrypted for the user before changing the password maintain retrievable, even though the password is changed. Additionally, the user has the freedom of choosing the password that is used.

Similar functionality applies to the embodiment, where the private key is not necessarily encrypted with the password, but instead only a partial private key is stored in the system. In that case, if the user wants to change his/her password, the whole private key is first retrieved with the old password and then a new partial private key is generated by means of the new password and the whole private key. In this way the user maintains the freedom of choosing the password also in this case.

One should note that it is possible to change the private key for example if it is suspected that the private key has been compromised. For such case the system may be configured to generate new private and public keys and then to decrypt old messages with the old private key and to re-encrypt them with the new public key whereby the old messages are still retrievable despite of changing the keys. In fact the user does not even need to know about the key change. The user needs to give the password though to enable the key change.

Figure 3A:
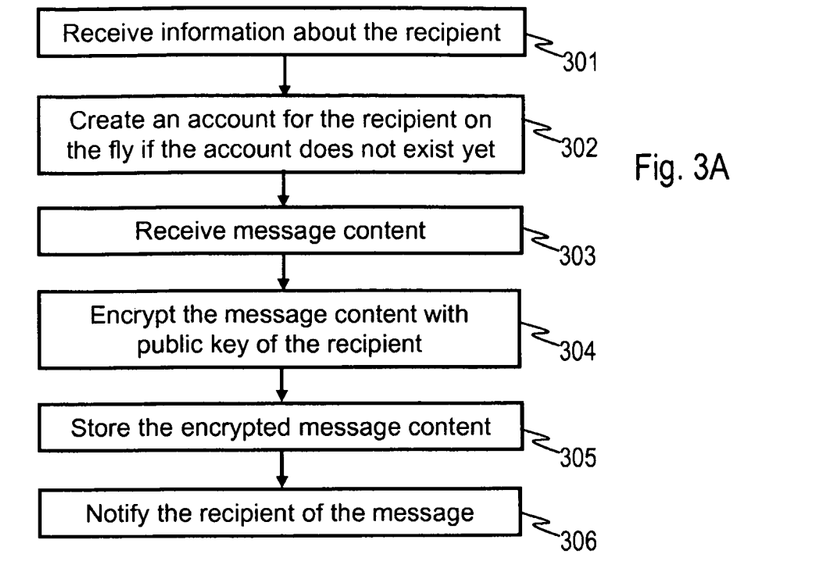
FIG. 3A is a flow diagram illustrating message sending in accordance with an embodiment.

FIG. 3A is a flow diagram illustrating message sending in accordance with an embodiment. The method proceeds as follows:

1. The sender gives information about the recipient of the message (phase 301). The information that is given may be for example a user ID or some address (e.g. e-mail address) of the sender. Depending on the implementation, an e-mail address may be the user ID. Alternatively there may be a separate user ID.
2. If the recipient does not have an account in the service, a new account is created on the fly (phase 302). Details of creating an account on the fly are further discussed below. It must be noted that in some systems this feature may be disabled. In that case, the sending of the message fails, if the recipient does not have an account in the system.
3. The sender gives the message content that is to be sent (phase 303). A secure connection, such as an SSL (secure socket layer) connection, is used for transferring the message content to the system.
4. The message content is encrypted with public key of the recipient (phase 304). The public key is retrieved from user account information stored in memory/database/some other storage area by means of the information about the recipient given by the sender.
5. The message content is stored in encrypted form (phase 305).
6. The recipient is notified of the message for example in an e-mail message (phase 306) so that the recipient may fetch the message from the system.

In an alternative embodiment in phase 304 above a random key is generated, the message content is encrypted with the random key and the random key is encrypted with the public key of the recipient. The system then stores both the random key and the message content in encrypted form.

Figure 3B:
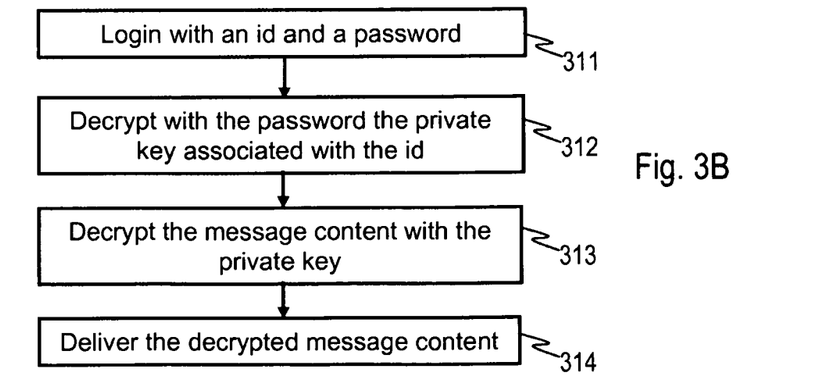
FIG. 3B is a flow diagram illustrating message fetching in accordance with an embodiment.

FIG. 3B is a flow diagram illustrating message fetching in accordance with an embodiment. The method proceeds as follows:

1. A user logs in with a user ID and a password (phase 311).
2. Private key associated with the user ID is decrypted with the password (phase 312).
3. The message content is decrypted with the decrypted private key (phase 313). The user gives a pointer to the message content for example by means of following a specifically formulated link, which has been sent to the user by the system.
4. The decrypted message content is delivered to the user (phase 313). The delivery is over a secure connection, such as an SSL connection.

In the alternative "random key" embodiment mentioned above the private key is used for retrieving the random key and the random key is then used for decrypting the message content in phase 313.

Figure 4A:
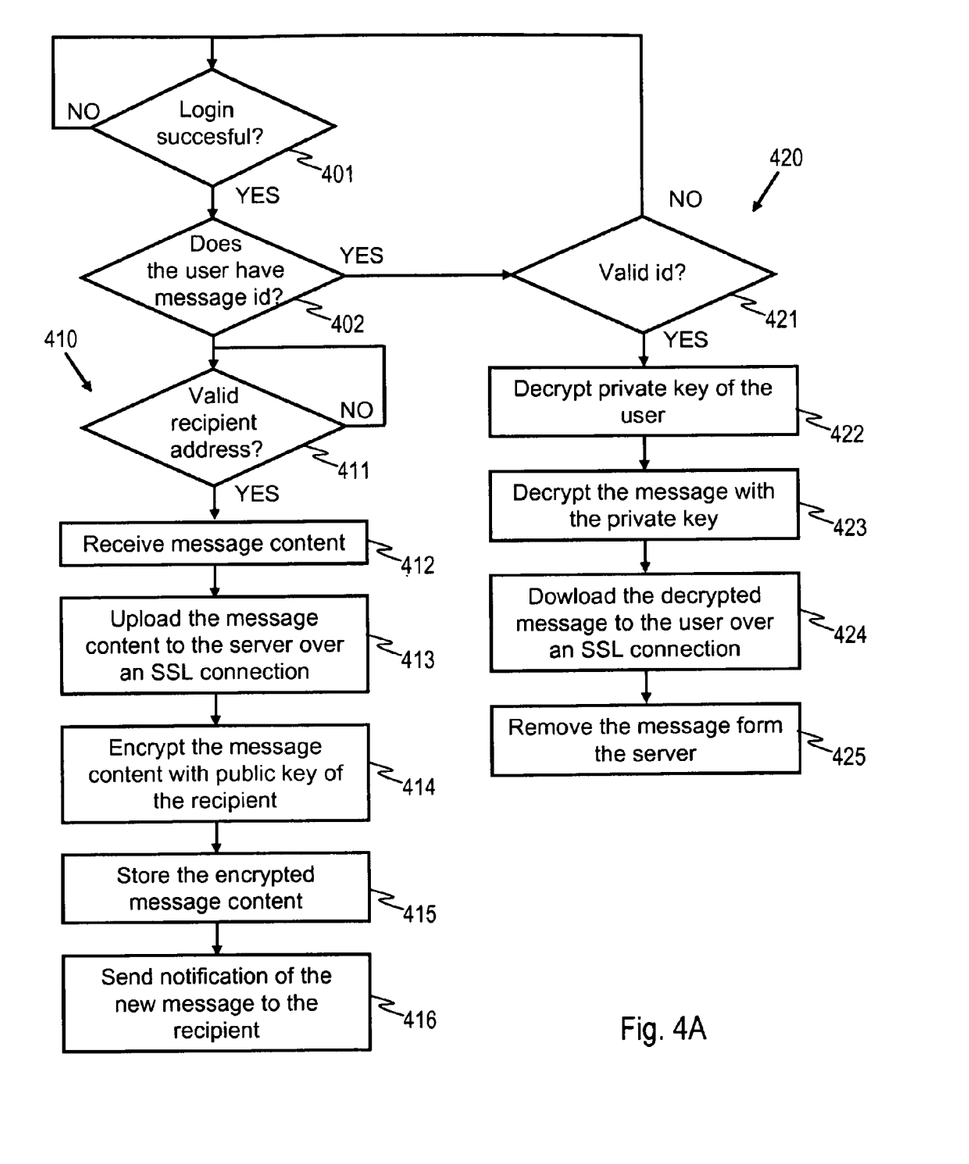
FIG. 4A is a flow diagram illustrating operation of a system of an embodiment.

FIG. 4A is a flow diagram illustrating operation of a system of an embodiment. The method proceeds as follows:

1. First a user logs into the system and the system checks if the login was successful (phase 401). If the login fails, the method returns to waiting for another login attempt.
2. If the login is successful, it is checked if the user came with a message id (phase 402). The user may have received a notification that a message is ready to be fetched. Such notification may include a link comprising a message id and if the user follows the link, the system received the message id. If a message id is submitted, the method proceeds to a message fetching branch 420, and if a message id is not submitted, the method proceeds to a message sending branch 410.
3. In the message sending branch 410, it is first checked if a valid recipient address is submitted (phase 411). If the recipient address is not valid, the method returns to waiting for another recipient address. It must be noted that instead of a recipient address also a user id or some other identification information about the recipient might be submitted. Furthermore, in a closed system, the validity check may require that the recipient address already exists in the system, whereas in an open system, the validity check may simple check that the recipient address comprises required components of an e-mail address, for example. In an open system this phase may also include creation of a new account, if the recipient does not exist in the system yet. For the sake of clarity, such option is not shown in FIG. 4, though.
4. If the recipient address is valid, the user inputs message content that is to be sent to the recipient (phase 412).
5. The message content is uploaded to the system over a secure connection (phase 413).
6. Then public key associated with the recipient is retrieved from the system and the message content is encrypted with the retrieved public key (phase 414).

7. The message content is stored in the system in encrypted form (phase 415).
8. A notification indicating that a new message is ready to be fetched is then sent to the recipient for example in an e-mail message (phase 416).
9. In the message fetching branch 420, it is first checked if the message id that was submitted is valid (phase 421). If the message id is not valid, the procedure returns to waiting for another login attempt (phase 401).
10. If the message id is valid, user's private key is decrypted with the password provided by the user in the login (phase 422).
11. The message (corresponding to the message id) is then decrypted with the decrypted private key (phase 423).
12. The decrypted message is downloaded to the user over a secure connection (phase 424).
13. Thereafter the message may be removed from the server (phase 425) for example after a predefined time has elapsed from fetching the message or after receiving a command to remove the message.

Figure 4B:
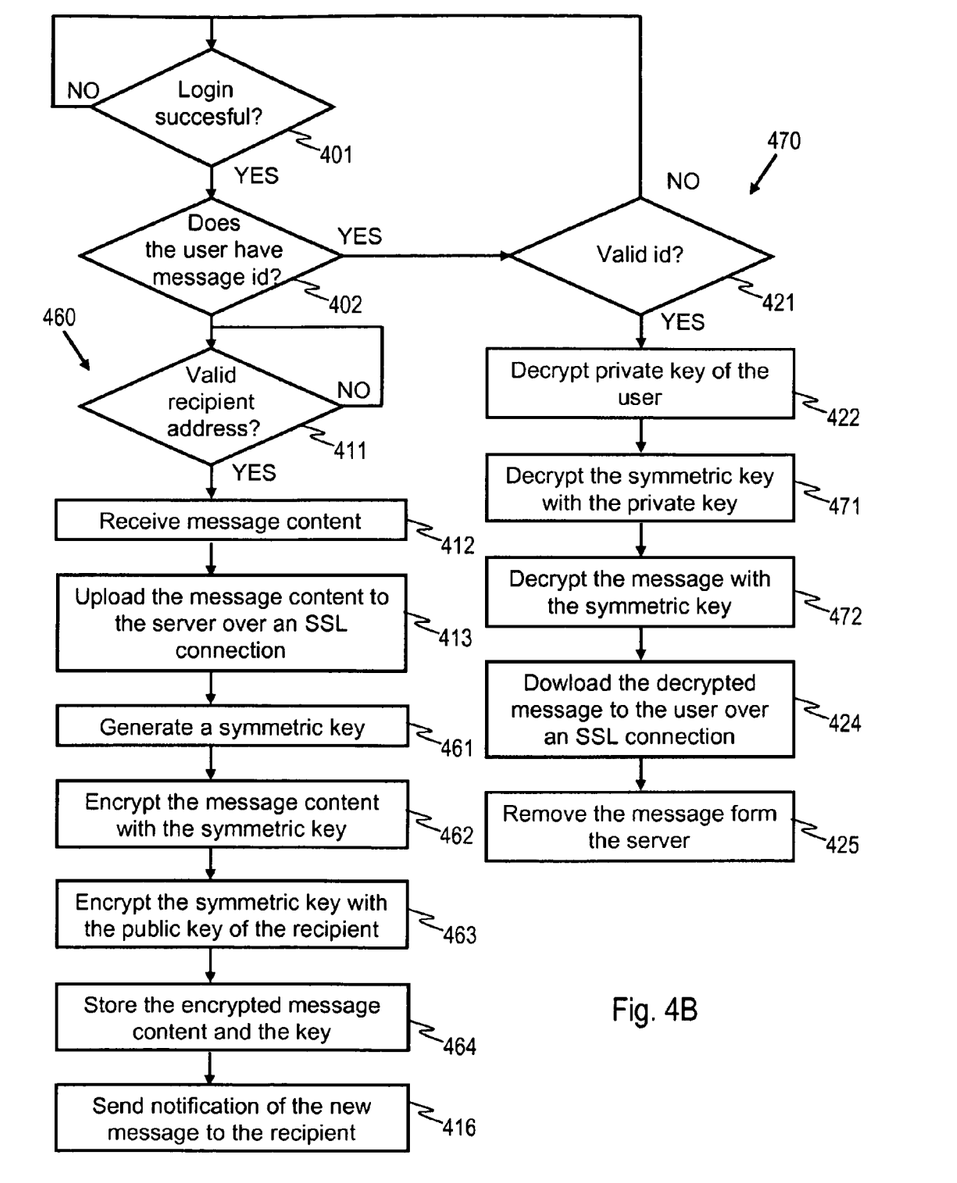
FIG. 4B is a flow diagram illustrating operation of a system of another embodiment.

FIG. 4B is a flow diagram illustrating operation of a system of another embodiment. The method is similar to the method of FIG. 4A except that now phases 414 and 415 are replaced by phases 461-466 and phase 423 is replaced by phases 471-472.

In phase 461 of the message sending branch 460, a random key is generated for example by using a secure random number generation library provided as a part of a cryptographic package used for other cryptography. The library may use a standard cryptographic cipher, such as AES (Advanced Encryption Standard) to generate the key. This random key is then used for encrypting the message content in phase 462. This encryption is symmetric. Then public key associated with the recipient is retrieved from the system and the random key is encrypted with the retrieved public key (phase 463). The encryption of the random key is asymmetric. In phase 466 the message content is stored in the system in encrypted form and also the random key is stored in encrypted form.

In phase 471 of the message fetching branch 470, the random key (associated with the message id) is decrypted with the decrypted private key. The message (corresponding to the message id) is then decrypted with the decrypted (symmetric) random key (phase 472).

For the remaining phases of FIG. 4B, a reference is made to the description of FIG. 4A wherein corresponding phases are discussed.

By using the random key for encryption one may achieve better system performance and increased security. Symmetric encryption is several times faster than asymmetric encryption, and symmetric encryption also produces results that are more difficult to decrypt with brute force methods. As the symmetric key is almost always considerably shorter than the actual message, it may be (several times) faster to encrypt the message with symmetric encryption and to encrypt the random key with asymmetric encryption than to encrypt the message with asymmetric encryption.

Additionally, the nature of the asymmetric encryption makes a private key easier to be guessed when there is large amount of data encrypted with the public key associated with the private key. When using a random key for encryption, every message is encrypted with different key and only a small number of random keys are encrypted with the same asymmetric key, thus making the attack area much smaller. Yet the random key is encrypted with asymmetric encryption, whereby advantages of asymmetric encryption are obtained.

Figure 4C:
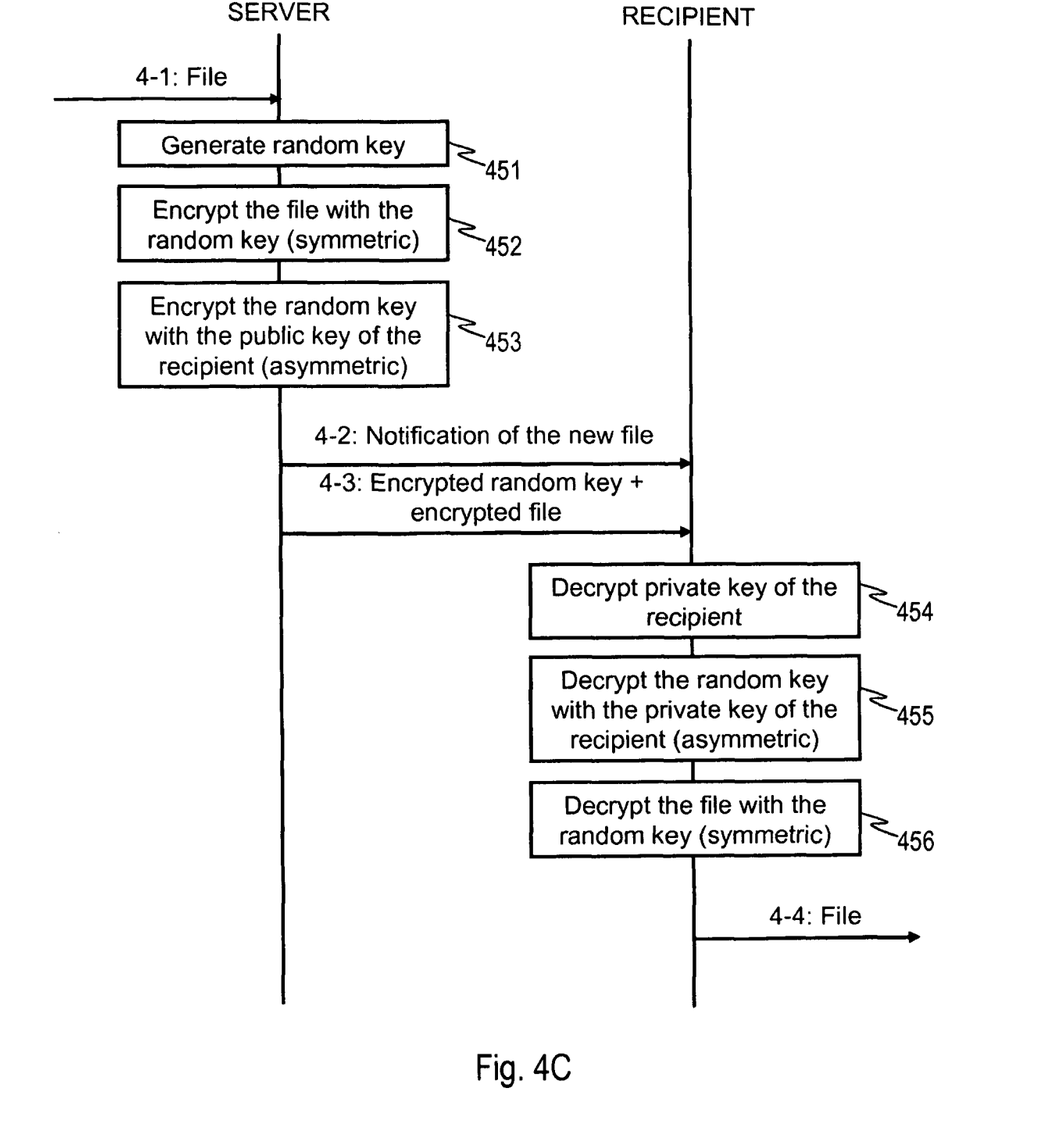
FIG. 4C is a messaging diagram illustrating an embodiment.

FIG. 4C is a messaging diagram illustrating an embodiment of the invention.

First a file 4-1 to be securely transferred is received at a server. Then a random key is generated in phase 451. The file is encrypted with the random key (symmetric encryption) in phase 452 and the random key is encrypted with a public key associated with the recipient of the file (asymmetric encryption) in phase 453. The encrypted file and random key are stored at the server.

The recipient of the file is informed of the file by means of a notification 4-2 and the encrypted random key and the encrypted file are provided to the recipient. In phase 454, a private key of the recipient is decrypted by means of a password provided by the recipient. The random key is then decrypted with the private key in phase 455 and the decrypted random key is used for decrypting the file in phase 456. The file 4-4 is then provided to the recipient in decrypted form.

One should note that the phases 454-456 of FIG. 4C may actually take place at the server. Alternatively they may be conducted by client software residing in an end user device of the recipient.

In an embodiment there is a controlled functionality for creating new accounts in the system. For example, only some predefined administrators of the system may have rights to create new accounts. In this way one may achieve the benefit that the system may be closed such that transfer of information is allowed only to predefined persons. For example, information transfer may be allowed only between employees of a certain company.

Alternatively the system may allow transfer of information content to anybody. If the intended recipient does not yet have an account in the system, the account may be created on the fly at the same time as the information is uploaded into the system. In an embodiment the sender is then notified of the details of the account of the recipient and the sender may provide this information to the recipient in any suitable manner. For example text message or phone or a conventional letter may be used for providing this information. In another embodiment the system may provide the details of the new account directly to the recipient for example in a text message. This may however require that the sender provides the necessary contact information to the system. In both of these embodiments it may be beneficial to use a different communication system for providing the details of the new account than the system that is used for notifying recipients of a new, securely transferred piece of information. The system may also require that the recipient changes the password of the account before allowing reading of the securely transferred information.

In order to discuss one example implementation, let's assume that an existing user, Alice, wants to securely transfer a message to Bob, who does not have a user account yet. In that case, the procedure may be for example the following:
1. Alice logs in to the service.
2. Alice indicates that a message is to be sent to Bob.
3. A new user account (Bob), a nonce, and private and public keys are generated for the new user.
   Bob's password is left blank.
4. The message is encrypted with Bob's public key.
5. Bob's private key is encrypted with the nonce and then saved in encrypted form.
6. A first link is sent to Bob in a first message.
   The first link includes Bob's e-mail address and the nonce.
   The link allows Bob to set his password.
   Bob's private key is decrypted with the nonce, and encrypted with the new password.

7. A second link is sent to Bob in a second message.
   This second link allows Bob to go to his account and read the message.
   When Bob clicks the link, he will be prompted for his password.
   After entering the password Bob can read the message.

By means of sending the first and the second link in separate messages, one may achieve the benefit that a man-in-the-middle attack requires that Eve (the man-in-the-middle) captures both the first and the second message. For further security one may use different communication methods for sending the first and the second message. For example two different e-mail addresses might be used or the first message might be sent in an SMS and the second one in e-mail. In this way, a third party would not obtain access to the securely transferred message even if Bob's e-mail account would be compromised.

In yet another embodiment there is a mechanism for inviting users to the message transfer service. In this case, the procedure may be for example the following:
1. Alice logs in to the service and sends an invitation to Bob, who does not have a user account yet.
2. Bob gets an invitation e-mail from the service and gets registered into the service.
3. Both Alice (the sender of the invitation) and Bob (the invitee) are notified that they may now send secure messages to each other. They may get for example a notification saying "You can now send secure messages to each other, but it is recommended that you confirm each other's identity through reliable methods before doing so."
4. Thereafter Alice can send secure messages to Bob (and vice versa).

In an embodiment the information content that has been transferred through the secure communication server is removed once it has been fetched by the recipient. Alternatively, the system may remove the information after it has been fetched a predefined number of times or after a predefined time (e.g. 24 hours or three days) has lapsed from the first time the information was fetched or from sending the information, or the system may store the information until it is manually removed by the recipient.

In an embodiment the system may be configured to notify the sender that the information has been fetched.

Figure 5A:
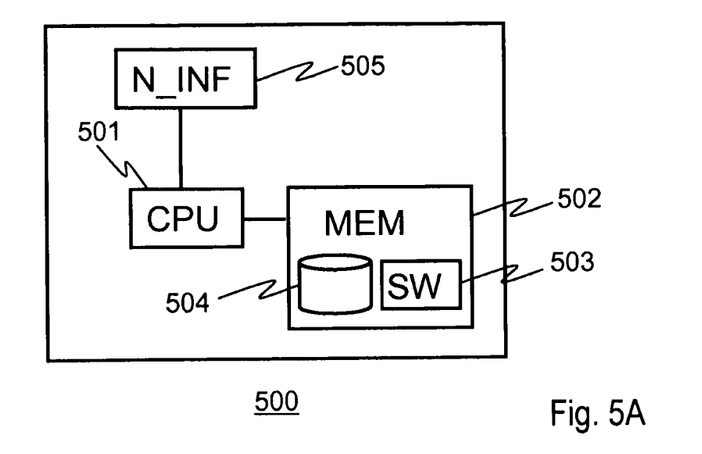
FIG. 5 shows a device suited for implementing various embodiment of the invention.

FIG. 5A shows a block diagram of an apparatus 500 suited for implementing various embodiments of the invention. The apparatus 500 may be a typical computer, such as a general purpose computer or a server, with possibly distributed functions. The apparatus comprises a processor 501 for controlling the apparatus and a memory 502 including a computer program code or software 503. The processor 501 is typically a central processing unit (CPU) or a master control unit MCU. Alternatively, the processor may be a microprocessor, a digital signal processor, an application specific integrated circuit, a field programmable gate array, a microcontroller or a combination of such elements.

The software 503 includes instructions for the processor 501 to control the apparatus 500 such as an operating system and different computer applications. The software 503 may comprise instructions for controlling the apparatus to provide some functionality of the invention. The instructions may for example control the apparatus to operate as a secure communication server according to some embodiments of the invention. Additionally the memory comprises database 504 arranged to store IDs and public/private keys according to various embodiments of the invention. The same database may also store messages and/or documents that are transferred through the system, but equally there may be another database or some other storage means for this purpose.

The apparatus 500 further comprises a network interface unit N_INF 505 such as a LAN (Local Area Network), Ethernet or WLAN (Wireless LAN) unit. The apparatus 500 could also comprise a user interface (not shown), such as a display and a keyboard, but the user interface may be implemented also by means of a remote connection through the network interface unit.

Figure 5B:
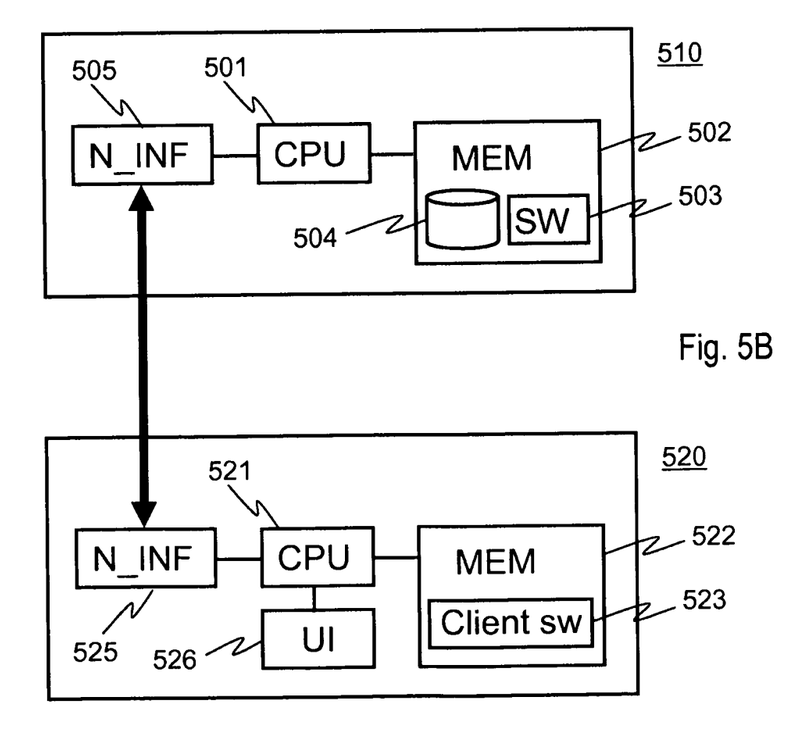

FIG. 5B shows a block diagram of two co-operating apparatuses, a server 510 and an end user device 520, suited for implementing various embodiments of the invention. In this example some functionality resides in client software running in the end user device 520 and some functionality is implemented in the server 510.

The server 510 and the end user device 520 may be typical computers, such as general purpose computers or servers, with possibly distributed functions. Additionally the end user device may be a laptop computer, a mobile phone, or some other wireless communication device.

The server 510 comprises identical blocks as the secure communication server 500 of FIG. 5A. Thus, the blocks of the server 510 are not discussed in detail. In effect, the server 510 may be the secure communication server 500 of FIG. 5A.

The end user device 520 comprises a processor 521 for controlling the device and a memory 522 including a computer program code or software. The processor 521 is typically a central processing unit (CPU) or a master control unit MCU. Alternatively, the processor may be a microprocessor, a digital signal processor, an application specific integrated circuit, a field programmable gate array, a microcontroller or a combination of such elements.

The software residing in the memory 522 includes instructions for the processor 521 to control the device 520 such as an operating system and different computer applications. Further the memory 522 comprises a client software 523 including instructions for controlling the device to provide some functionality of the invention.

The end user device 520 further comprises a network interface unit N_INF 525 such as a LAN (Local Area Network), Ethernet or WLAN (Wireless LAN) unit. Furthermore the network interface may be a radio communication unit providing an air interface to communication networks or there may be such radio communication unit in addition to the network interface 525. Additionally the end user device 520 comprises a user interface (UI) 526, such as a display and a keyboard, for receiving user input and giving output to the user.

In an embodiment the client software 523 in the end user device 520 and the server 510 co-operate as follows.
The client software:
receives the information content that is to be transferred and information about the recipient of the information content from a user of the end user device,
asks for the public key of the recipient from the server (if necessary the server may create a new account for the recipient as discussed above in connection with other embodiments),
encrypts the information content with the public key locally in the end user device, and
transfers the encrypted information content to the server.

The client software may alternatively generate a random key, decrypt the information content with the random key and decrypt the random key with the public key. In this case the client software transfers also the encrypted random key to the server.

Thereafter the server may continue to handle the encrypted information in the same way as in various other embodiments. A benefit that may be achieved with this embodiment is that the information does not need to leave the end user device in unencrypted form, whereby security may be increased.

Various embodiments have been presented. It should be appreciated that in this document, words comprise, include and contain are each used as open-ended expressions with no intended exclusivity.

The foregoing description has provided by way of non-limiting examples of particular implementations and embodiments a full and informative description of the best mode presently contemplated by the inventors for carrying out the invention. It is however clear to a person skilled in the art that the invention is not restricted to details of the embodiments presented above, but that it can be implemented in other embodiments using equivalent means without deviating from the characteristics of the invention.

Furthermore, some of the features of the above-disclosed embodiments of this invention may be used to advantage without the corresponding use of other features. As such, the foregoing description should be considered as merely illustrative of the principles of the present invention, and not in limitation thereof. Hence, the scope of the invention is only restricted by the appended patent claims.

The invention claimed is:

1. A method for secure transfer of information through a centralized system, the method taking place in said centralized system and the method comprising:
    maintaining in said centralized system user account information, a user account of a certain user comprising at least a user id and associated public and private keys, the private key being retrievable by utilizing a password of said certain user,
    via a communication link, receiving identification information relating to a recipient,
    retrieving the public key of said recipient from said user account information by utilizing said identification information,
    receiving information content addressed to said recipient,
    storing in said centralized system said information content for said recipient in encrypted form, wherein said information content is symmetrically encrypted with a random key, and the random key is asymmetrically encrypted with said retrieved public key,
    storing in the centralized system the random key in encrypted form, and
    notifying said recipient of said encrypted information content stored in said centralized system, wherein
    only part of the private key is stored in the user account information, and a combination of the stored part of the private key and the password forming a full private key.

2. The method of claim 1, further comprising
    receiving said information content in unencrypted form, and
    encrypting said information content in said centralized system.

3. The method of claim 1, further comprising
    providing said retrieved public key to an external device, and
    receiving said information content in encrypted form from said external device.

4. The method of claim 1, wherein the private key in the user account information is encrypted with said password.

5. The method of claim 1, wherein said identification information is an id stored in said user information, an email address of the recipient, phone number of the recipient, or some other address of the recipient.

6. The method of claim 1, further comprising
    responsive to being unable to find said user account information by utilizing said identification information, creating a user account for said recipient, and
    informing the recipient of the created user account.

7. The method of claim 1, further comprising
    allowing a user to log in by utilizing login information comprising a user id and a password,
    verifying validity of the login information,
    receiving a pointer to encrypted information content and retrieving said encrypted information content,
    retrieving private key associated with the user by utilizing the password,
    decrypting said encrypted information content by utilizing the private key, and
    providing to the user the information content in decrypted form.

8. The method of claim 7, further comprising
    confirming that the login information is valid, if the password can be used for retrieving the private key relating to the user id.

9. An apparatus, comprising:
    a storage area configured to store user account information, a user account of a certain user comprising at least a user id and the associated public and private keys, the private key being retrievable by utilizing a password of said certain user,
    an input configured to receive identification information relating to a recipient and information content addressed to said recipient,
    a processor configured to retrieve public key of said recipient from said user account information by utilizing said identification information, and
    a second storage area configured to store said information content for said recipient in encrypted form, wherein said information content is symmetrically encrypted with a random key, and the random key is asymmetrically encrypted with said retrieved public key, the storage area being configured to store the random key in encrypted form, wherein
    the processor being further configured to notify said recipient of said encrypted information content stored in said apparatus, wherein
    the storage area is configured to store only part of the private key, and a combination of the stored part of the private key and the password forming a full private key.

10. The apparatus of claim 9, wherein the processor is further configured
    to receive said information content in unencrypted form, and
    to encrypt said information content in said apparatus.

11. The apparatus of claim 9, wherein the processor is further configured
    to provide said retrieved public key to an external device, and
    to receive said information content in encrypted form from said external device.

12. The apparatus of claim 9, wherein the storage area is configured to store the private key encrypted with said password.

13. The apparatus of claim 9, wherein the processor is further configured to create a user account for said recipient responsive to being unable to find said user account information by utilizing said identification information, and to inform the recipient of the created user account.

14. The apparatus of claim 9, wherein the processor is further configured to allow a user to log in by utilizing login information comprising a user id and a password, to verify validity of the login information, to receive a pointer to encrypted information content and retrieving said encrypted information content, to retrieve private key associated with the user by utilizing the password, to decrypt said encrypted information content by utilizing the private key, and to provide to the user the information content in decrypted form.

15. The apparatus of claim 14, wherein the processor is further configured to confirm that the login information is valid, if the password can be used for retrieving the private key relating to the user id.

16. A memory embodying a computer executable program code, which when executed by a processor of a centralized system is configured to control the centralized system to perform maintaining in said centralized system user account information, a user account of a certain user comprising at least a user id and the associated public and private keys, the private key being retrievable by utilizing password of said certain user, receiving identification information relating to a recipient, retrieving public key of said recipient from said user account information by utilizing said identification information, receiving information content addressed to said recipient, storing in said centralized system said information content for said recipient in encrypted form, wherein said information content is symmetrically encrypted with a random key, and the random key is asymmetrically encrypted with said retrieved public key, storing in the centralized system the random key in encrypted form, and notifying said recipient of said encrypted information content stored in said centralized system, wherein only part of the private key is stored in the user account information, and combination of the stored part of the private key and the password forming a full private key.

* * * * *